Nov. 21, 1967  A. M. SCHWARZ  3,353,953
PROCESS OF PURIFYING AN ARSENIC CONTAINING IRON ORE
Filed Nov. 24, 1964
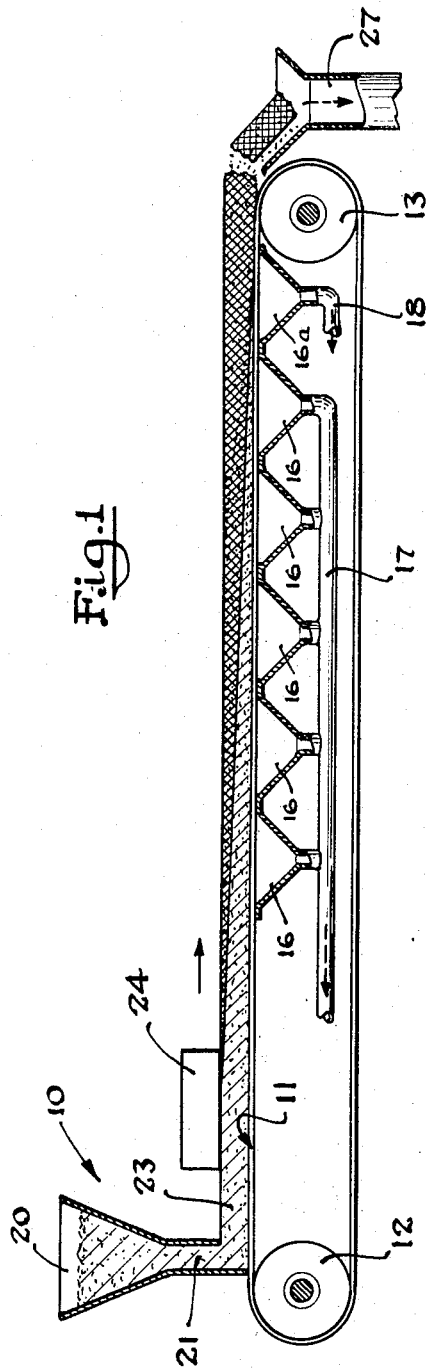
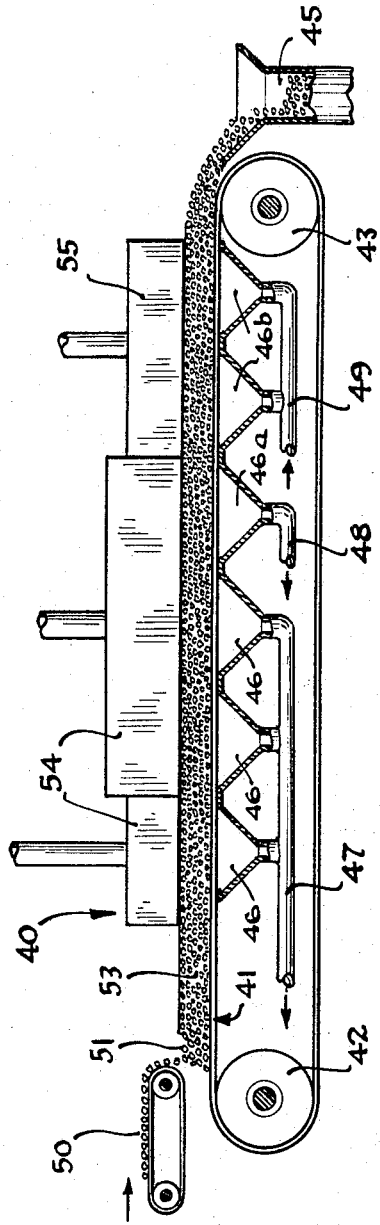
Inventor
Arthur M. Schwarz
By Hibben, Noyes & Bicknell
Attorneys 3,353,953
PROCESS OF PURIFYING AN ANSENIC-
CONTAINING IRON ORE
Arthur M. Schwarz, Munster, Ind., assignor to Inland
Steel Company, Chicago, Ill., a corporation of Delaware
Filed Nov. 24, 1964, Ser. No. 413,418
22 Claims. (Cl. 75—6)

The present application is a continuation-in-part of the applicant's co-pending United States patent application Ser. No. 10,780, filed Feb. 24, 1960; now U.S. Patent No. 3,166,403.

The present invention relates generally to the preparation of heat treated ore products, particularly to an improved method of producing heat treated fluxed iron ore having a low arsenic content from iron ore containing as an impurity a relatively high percentage of arsenic, and to an improved method of removing arsenic from an iron ore.

There has been increasing recognition in the metallurgical art that the production of iron in a blast furnace can be significantly increased by charging thereto an iron ore product having a balanced composition containing all the components required for use in the blast furnace.

Fluxed iron ore products include the iron ore sinter and heat hardened pellets which contain insufficient added basic matter to react with all the silica and other acidic components of the iron ore (i.e., partially fluxed) and the completely self-fluxing iron ore sinter and pelletized products which contain all the basic matter required to react with the silica and other acidic matter in the iron ore. For example, the use of 100% self-fluxing iron ore sinter in a blast furnace has been reported to increase the productivity of the blast furnace by as much as 74% [Blast Furnace and Steel Plant, vol. 47, No. 7, p. 697 (1959)]. A blast furnace charged with a self-fluxing sinter has also been found to have a significantly lower rate of coke consumption. Accordingly, the production of a fluxed iron ore sinter and fluxed iron ore pellets is of increasing importance, and it is highly desirable to develop economical methods of producing good quality fluxed iron ore sinter and fluxed pellets from all types of iron ore.

Conventionally fluxed iron ore products are made on the Dwight-Lloyd type continuous strand apparatus by adding limestone as the fluxing agent to the sinter feed or to the pelletizing feed mixture. However, when iron ores having a high arsenic content are subjected to a conventional pelletizing process, for example, using as the fluxing agent limestone or calcium oxide in an amount as low as 50% by weight of the $SiO_2$ content of the iron ore for producing fluxed heat hardened pellets, the arsenic in the iron ore is not completely or even largely removed during the pelletizing operation. Also, for example, it has been found that as the calcium oxide content in an iron ore sinter mixture increases from 0% to about 10% by (dry) weight of the sinter mixture, the percentage of arsenic removed drops correspondingly from about 90% when no calcium oxide is present to only 3% arsenic removal when about 10% calcium oxide is present in the sinter mixture. And, while the removal of arsenic can be improved by increasing the coke breeze content of the iron ore sinter mixture to about 8%, it is generally considered necessary to limit the coke breeze content of an iron ore sinter mixture to about 6% to 6.5% in order to obtain satisfactory sinter quality. It is thus impractical to prepare by using limestone or calcium oxide as the principal fluxing agent satisfactory iron ore sinter which is completely self-fluxing or iron ore pellets which are significantly fluxed (i.e., having the fluxing agent present in an amount at least about 50% by weight of the $SiO_2$ content of the iron ore) from iron ore initially having an objectionably high arsenic content (i.e.,
about .03% by weight arsenic). As there are considerable reserves of such high arsenic-containing iron ores available and otherwise suitable for using in a blast furnace, it is highly desirable to provide an improved method of removing arsenic from said iron ores and particularly to provide a method of producing a significantly fluxed or completely self-fluxing iron ore sinter and heat hardened pellets suitable for use in a blast furnace.

It is therefore an object of the present invention to provide an economical method of producing improved fluxed iron ore sinter and heat hardened fluxed iron ore pellets from an iron ore having an objectionably high arsenic content.

It is a further object of the present invention to provide a method of producing a fluxed iron ore sinter and fluxed heat hardened iron ore pellets from an iron ore originally having an arsenic content which is objectionable for use in a blast furnace for producing sheet metal products.

Another object of the present invention is to provide an improved method of removing arsenic from iron ore while producing a fluxed iron ore sinter product and heat hardened fluxed iron ore pellets.

It is still another object of the present invention to provide a more economical method of removing and collecting volatile arsenic impurities from a bed of iron ore during heat treating said bed on a continuous conveyor means.

Other objects of the present invention will be apparent from the detailed description and claims to follow when read in conjunction with the accompanying drawing, wherein:

FIG. 1 is a schematic side elevational view of apparatus suitable for use in applying the present invention to the production of a fluxed sinter product; and FIG. 2 is a schematic side elevational view of apparatus suitable for use in applying the present invention to the heat induration of fluxed pellets.

It has been discovered that a very significant improvement in the completeness of the removal of arsenic is attained by maintaining the amount of calcium oxide present in a fluxing agent at a minimum during an iron ore heat treating process, such as during sintering or while forming heat hardened pellets therefrom, and using as the essential ingredient of the fluxing agent magnesium oxide or a magnesium compound, such as magnesium carbonate, which on heating to a temperature required for sintering or heat hardening iron ore pellets yields magnesium oxide. Thus, it has been found necessary to substantially limit the amount of lime or other calcium oxide-containing compound as a fluxing agent and using preferably not substantially in excess of about 3% by weight calcium oxide, or the equivalent amount of a calcium oxide yielding compound in order to effect significant reduction of the arsenic content. And, when calcium oxide is used in combination with magnesium oxide, preferably a minimum of at least about 2% by weight magnesium oxide-containing material is used in the preparation of the fluxed iron ore sinter or fluxed iron ore heat hardened pellets in order to effect significant removal of arsenic to permit the production of satisfactory fluxed iron ore products. Where magnesium oxide is present in an amount substantially in excess of 2%, it is possible to use therewith somewhat larger amounts of calcium oxide than when very small amounts of magnesium oxide are used and still effect significant removal of arsenic from the iron ore.

Particularly useful applications of the present invention are the production of a high-grade fluxed sinter product and heat hardened fluxed iron ore pellets suitable for use in a blast furnace from an iron ore feed mix containing a substantial amount of a high arsenic content iron ore (i.e., significantly in excess of about .01% by weight arsenic). While iron ores having a high arsenic content do not show any significant reduction in the arsenic content thereof after being subjected to a basic or fluxed sintering process when as little as 7% by weight limestone (i.e., 4.4% CaO) is used as the fluxing agent in the sinter mixture or wherein an equivalent amount of another CaO yielding compound is used in the sinter mixture, it has been found that when magnesium oxide or a magnesium oxide yielding compound is used as the essential constituent of the fluxing agent in an iron ore sinter or iron ore pelletizing mixture, a substantial proportion of the arsenic in the iron ore can be removed on heating the sinter mixture or pellet bed on a conventional Dwight-Lloyd type apparatus.

In the following Table I is shown the percentage of arsenic removed from fluxed sinter mixtures prepared from a high arsenic content iron ore mixture having added thereto 6% by weight coke breeze as the fuel and with the sinter mixtures containing the specified amounts of limestone, dolomite and magnesium carbonate as the fluxing agents:

TABLE I.—ARSENIC REMOVAL DATA ON FLUXED IRON ORE SINTER MIXTURE PREPARED WITH MARMION ORE, LIMESTONE, DOLOMITE AND MAGNESIUM CARBONATE

| Test No. | 1 | 2 | 3 | 4 | 5 | 6 | 7 |
|---|---|---|---|---|---|---|---|
| Caland Type Ore* (Marmion), wt. percent | 84 | 80 | 85 | 84 | 82 | 85 | 85 |
| Limestone, wt. percent | 0 | 6 | 0 | 8 | 10 | 7.5 | 15 |
| Raw Dolmite, wt. percent | 0 | 0 | 15 | 0 | 0 | 7.5 | 0 |
| Magnesium carbonate, wt. percent | 16 | 14 | 0 | 8 | 8 | 0 | 0 |
| Sinter Yield, wt. percent | 79 | 78 | 79 | 79 | 79 | 80 | 80 |
| Sinter Analyses, wt. percent: | | | | | | | |
| CaO | 1.50 | 4.80 | 5.30 | 6.00 | 7.40 | 7.80 | 9.85 |
| MgO | 8.70 | 7.55 | 4.75 | 4.64 | 4.03 | 2.24 | 0.40 |
| $SiO_2$ | 7.85 | 7.69 | 7.97 | 7.50 | 7.76 | 7.35 | 7.80 |
| $CaO/SiO_2$ Ratio | 0.19 | 0.63 | 0.67 | 0.80 | 0.96 | 1.06 | 1.24 |
| CaO and $MgO/SiO_2$ Ratio | 1.30 | 1.60 | 1.27 | 1.42 | 1.47 | 1.40 | 1.37 |
| Arsenic (Theoretical), wt. percent | 0.032 | 0.031 | 0.032 | 0.032 | 0.031 | 0.032 | 0.032 |
| Arsenic (Actual), wt. percent | 0.007 | 0.014 | 0.019 | 0.020 | 0.021 | 0.023 | 0.031 |
| Arsenic Removed, wt. percent | 78.2 | 54.9 | 40.7 | 37.5 | 32.3 | 28.1 | 3.1 |

*Chemical Analysis of Original Iron Ore:

| | Dry | Natural | Range |
|---|---|---|---|
| Fe | 56.30 | 51.30 | 50.00–60.00 |
| $SiO_2$ | 7.90 | 7.20 | 4.0–8.0 |
| As | 0.033 | 0.030 | 0.03–0.04 |

The foregoing data indicate that with increasing lime (CaO) content in the sinter bed mix the percentage of arsenic removed progressively decreases. Even more significant, however, is the clear indication that as the proportion of magnesium carbonate (i.e., magnesia) increases, the arsenic removal increases markedly, and that the most arsenic is removed when magnesium carbonate is the sole fluxing agent with no calcium oxide material being used. It has thus been discovered that a magnesium oxide yielding material does not have significant arsenic binding properties and does not appreciably retard arsenic removal during the fluxed sintering operation, nor otherwise adversely affects the sinter quality.

In FIG. 1 of the drawing is shown a sintering apparatus which is adapted to produce a fluxed sinter product of the foregoing type and which has an endless conveyor grate 11 providing a perforated gas permeable lower supporting surface movable between spaced drive wheels 12, 13 disposed at opposite ends of the sinter apparatus 10. The grate 11 is adapted to move between spaced side wall sections which extend the length of the sinter machine and provide lateral support for a sinter bed disposed on the grate 11. Positioned immediately below the grate 11 are a plurality of contiguous wind boxes 16, 16a which are connected with suitable suction fans (not shown) by conduits 17, 18, respectively, to provide the required draft through the sinter bed on grate 11. Conduit 18 is connected with the wind box 16a disposed adjacent the point at which the sinter layer burns through in order to convey the arsenic containing gases therefrom to special arsenic removal apparatus.

At the forward end of the sintering apparatus 10, a sinter feed hopper 20 is positioned above the sinter gate 11 with the discharge outlet 21 thereof adjacent the surface of the grate 11. The hopper 20 is adapted to deposit onto the sinter grate 11 a sinter mixture layer 23 formed essentially of carbon, a fluxing agent and iron ore having a relatively high arsenic content (i.e., .035% by weight arsenic). The fluxing agent consists of an MgO yielding compound, such as magnesium carbonate, and has a relatively low concentration of CaO or a CaO yielding material. Adjacent the hopper 20 and immediately above the sinter mixture layer 23 is an ignition hood 24 which ignites the fuel in the sinter mixture as a downwardly flowing draft is maintained through the layer of sinter mixture by the several wind boxes 16, 16a disposed below the grate 11. The discharge outlet 21 of the hopper 20 is adjustable so that the depth of the layer 23 can be varied. The fluxed sinter product having a substantially reduced arsenic content is discharged from the end of the sinter apparatus 10 and is easily broken into pellet-like particles which can be conveyed through conduit means 27 for use in the preparation of a blast furnace charge.

Studies of the percentage of arsenic at various parts of the sinter layer during the sintering operation have shown that the temperature of the sinter layer must reach almost the temperature of fusion before any reduction in arsenic content takes place. Thus, if insufficient fuel, such as coke breeze, is mixed with the iron ore to effect substantial fusion, there is no significant removal of arsenic. For example, in a sinter bed containing from 2% to 3% coke breeze, there was no significant sintering or arsenic removal. When about 3.0% to 4.5% coke breeze is used, up to about 78% of the arsenic in the sinter mixture is removed during an acidic (i.e., flux free) sintering process. At a coke breeze level of about 6%, about 80% to 90% of the arsenic present can be removed in the instant sinter process.

It has also been observed that during the sintering of the iron ore according to the present invention, the arsenic is removed from the upper portion of the acid sinter layer and is retained in the zone immediately in front of the gradually progressing fusion zone. Thus, the arsenic removed from the upper portions of an acid sinter layer is first absorbed on the lower portions of the layer of iron ore sinter mixture before it leaves the sinter bed. The hot waste gases passing through the sinter bed do not remove the arsenic as long as the heat thereof can be absorbed by the lower portions of the acid sinter layer and the arsenic leaves the acid sinter layer only when the fusion zone progresses to the lower level of the sinter bed.

These findings have resulted in substantial savings being made in the manner of processing the gases passed through the sinter bed. Thus, it has been found that only a limited volume of the total gases need be treated in special arsenic removing apparatus in order to effectively recover the objectionable arsenic in the gases and prevent pollution of the atmosphere. And, by intensively treating only a relatively small volume of the gases passing through the sinter bed, a more complete removal of arsenic is possible. As shown in FIG. 1 of the drawing, only the wind boxes disposed below the section of the sintering machine where the sinter bed burns through and immediately adjacent thereto, are connected by a separate draft conduit to special apparatus for effecting arsenic removal. More positive control over the precise sectors or wind boxes in which the arsenic is removed from the bed can also be achieved by controlling the temperature of the air drawn through the sinter bed by the wind boxes. Thus, for example, it is possible to accelerate the removal of arsenic at one or more critical locations by utilizing preheated air at specific sectors of the sintering machine. Similarly, cooler air can be used at other sectors of the sintering machine to retard arsenic removal, if this is desired.

It may be preferable to use an upward draft sintering process or a combination of updraft and downdraft drying and sintering process. It will also be understood that the relative proportions of the ingredients of the sinter mixture can be varied as required by the particular composition of the iron ores being sintered and operating characteristics of the sintering machine.

While the foregoing sintering process illustrating one embodiment of the present invention has been applied to Marmion iron ore having a high-arsenic content the present invention is also applicable to other high-arsenic containing iron ores such as the iron ores from the Steep Rock region of Canada, and other iron-bearing ores, such as hematite, magnetite and limonite ores, which may have an objectionable arsenic level of about .01% by weight.

Another important application of the present invention is in heat hardening or induration of fluxed iron ore pellets where it is necessary to use iron ore having an objectionably high concentration of arsenic (i.e., in excess of about .01% arsenic on a dry weight basis). As in the production of a fluxed sinter product, the iron ore pellets which are fluxed with a significant amount of lime or other substance which yields calcium oxide on heating do not evidence any significant reduction of the arsenic content thereof even after prolonged heating on conventional pelletizing apparatus at a temperature in excess of 2350° F. When however, magnesium carbonate or another compound which yields magnesium oxide on heating is used as the essential fluxing agent in the pelletizing feed mixture, the arsenic content of the green pellets is very substantially reduced when the pellets are heated in a conventional manner at a temperature in excess of about 2200° F., as by heating at a temperature of 2350° F. for a period of between about 10 and 20 minutes.

The heat induration apparatus used for producing iron ore pellets in accordance with the present invention can be any conventional continuous strand pelletizing apparatus, shaft furnace or conventional grate kiln apparatus. The continuous strand heat induration apparatus shown in FIG. 2 of the drawing is generally similar to the sintering apparatus of FIG. 1, and has an endless conveyor grate 41 providing a perforated gas permeable lower supporting surface movable between spaced drive wheels 42, 43 disposed at the opposite ends of the heat induration apparatus 40. A feeder means 50 is disposed above the sinter grate adjacent drive wheel 42, and the feeder discharge pellets onto the grate at 51 forming a bed or layer of fluxed green pellets 53 on the grate 41. The grate 41 is adapted to move between spaced side wall sections having a height of about 20 inches and extending the length of the apparatus 40 to provide lateral support for the pellet bed 53. Suitable hoods 54 provided with burners are located above the pellet bed 53 to provide hot gases for heating the bed 53. A cooling hood 55 for updraft cooling is provided adjacent the end of the bed 53. Disposed immediately below the grate 41 are a plurality of contiguous wind boxes 46, 46a, which are connected with suitable suction means by conduits 47, 48, respectively, to provide the required forced draft or suction through the pellet bed 53 on the grade 41. Conduit 47 is designed to draw hot gases from the wind boxes 46, conduit 48 conveys gases containing a high percentage of arsenic from wind box 46a to a separate arsenic removal apparatus. A conduit 49 supplies updraft cooling gases through wind boxes 46b to the bed 53.

TABLE II.—Arsenic Removal Data on Fluxed Iron Ore Pellets Prepared with a Caland Ore Containing the Specified Amounts of Limestone, Dolomite and Magnesium Carbonate as Fluxing Agents

| Test No. | 1 | 2 | 3 |
|---|---|---|---|
| Caland Type Ore*, wt. percent (dry) | 93 | 93 | 85 |
| Limestone, wt. percent | 7 | 0 | 0 |
| Raw Dolomite, wt. percent | 0 | 7 | 0 |
| Magnesium Carbonate | 0 | 0 | 15 |
| Pellet Analyses, wt. percent: | | | |
| CaO | 4.40 | 2.50 | .95 |
| MgO | .30 | 1.92 | 7.80 |
| $SiO_2$ | 7.41 | 7.35 | 7.15 |
| $CaO/SiO_2$ Ratio | .59 | .34 | .13 |
| $CaO+MgO/SiO_2$ Ratio | .63 | .60 | 1.22 |
| Arsenic (Theoretical), wt. percent | 0.036 | 0.036 | 0.035 |
| Arsenic (Actual), wt. percent | 0.032 | 0.019 | 0.009 |
| Arsenic Removed, wt. percent | 11.1 | 47.2 | 74.3 |

| *Chemical Analysis: | Dry | Natural |
|---|---|---|
| Fe | 57.10 | 52.50 |
| $SiO^2$ | 7.17 | 6.60 |
| As | .035 | .032 |

The data of Table II shows that a high proportion of the arsenic (74.3%) in the iron ore pellets is removed when the pellets are heat treated in the conventional manner with 15% by weight magnesium carbonate as the fluxing agent; wherein only 11.1% of the arsenic is removed when as little as 7% by weight limestone is used for fluxing the iron ore. It will also be evident that when magnesium oxide is used in combination with calcium oxide, there is a substantial improvement in the amount of arsenic removed from the pellets. Thus, when pellets are fluxed with 7% by weight dolomite (2.5% CaO+1.92% MgO) 47.2% of the arsenic is removed as compared with only 11.1% arsenic removed with 7% limestone (4.4% CaO+.3% MgO) is used to flux the iron ore pellets.

When forming heat hardened pellets from an arsenic-containing ore, it has been found possible and economically desirable to withdraw the hot gases passing through the pellet bed over a limited portion of the said bed and still effect recovery of substantially the entire amount of arsenic removed from the iron ore during the heat treatment process without in any way treating the gases passing through the remaining portions of the pellet bed. Thus, for example, it has been found feasible to separately collect the gases from that portion of the pellet bed where the entire bed has a temperature in excess of 400° F. and preferably between 1600° F. and the maximum temperature to which the bed is heated and passing these gases through suitable arsenic removal apparatus while the remaining gases are recycled or otherwise released without passing through arsenic removal apparatus; thereby realizing substantial savings in operating costs.

Others may practice the invention in any of the numerous ways which are suggested to one skilled in the art by this disclosure, and all such practice of invention are considered to be a part hereof which fall within the scope of the appended claims.

I claim:

1. In a process of purifying an arsenic-containing iron ore comprising heating a finely divided arsenic-containing iron ore supported on a continuously moving conveyor means by forcing a gas through said iron ore to cause a heat front to move progressively therethrough and heat the said iron ore, the improvement comprising; collecting the gases from a section of said conveyor means where said heat front passes through the final portion of said iron ore on said conveyor means separately from the remaining gas passing through the remaining portion of said iron ore, and conveying said gases separately from said remaining gas to apparatus for removing therefrom gaseous arsenic substances and arsenic-containing dust particles therefrom; whereby only a portion of the heating gas is passed through apparatus for removing arsenic.

2. A process as in claim 1, wherein the temperature of the gas forced through said iron ore is controlled to localize the said section from which arsenic-containing gases are removed.

3. A process as in claim 2, wherein the gas forced through said iron ore at the said section thereof where said heat front passes completely therethrough is heated to a temperature sufficient to raise the temperature of the said gases to a temperature of at least 400° F. at the time of leaving the said iron ore to prevent arsenic condensing therefrom.

4. A process as in claim 1, wherein the said dust contained in the gases conveyed to the apparatus for removing arsenic is recycled after substantial arsenic removal by sublimation and is used as a component of said sinter mixture.

5. In a process of purifying an arsenic-containing iron ore while sintering a layer of iron ore sinter mixture containing an iron ore having a high-arsenic content on a continuously moving conveyor means, including forcing a gas through said layer to cause a fusion front to move progressively through said layer and heat said layer immediately adjacent said front to a temperature of at least 400° F., the improvement comprising; collecting the gases from the portion of said layer where the fusion front passes through the final half of said layer separately from the remaining gases passing through the remaining portion of said layer, and conveying the first said gases separately from the remaining gases to apparatus for removing gaseous arsenic substances and arsenic-containing dust particles therefrom; whereby only a portion of the gases passing through said sinter bed is required to be treated in apparatus for removing arsenic.

6. In a process of purifying an arsenic-containing iron ore while heat hardening on a continuously moving conveyor means a layer of green iron ore pellets containing an iron ore having an objectionable arsenic content, including forcing a heated gas through said layer to heat said pellets to a temperature of at least 400° F., the improvement comprising; collecting separately from the remaining gases passing through said layer the arsenic-containing gases passing through the said layer which are withdrawn from said layer at the section thereof where every portion of said layer attains a temperature of at least 400° F., and conveying the said arsenic-containing gases separately from the remaining gases to apparatus for removing gaseous arsenic substances and arsenic-containing dust particles therefrom; whereby only a portion of the gases passing through said sinter bed is required to be treated in apparatus for removing arsenic.

7. A process as in claim 6, wherein the arsenic-containing gases are collected only from the section of the layer wherein every portion of the said layer has a temperature of at least 1600° F.

8. A process of removing arsenic from an iron ore having an objectionable amount of arsenic in excess of about .03% by weight and having an excess of silicon dioxide over basic components in the said iron ore while heat treating said iron ore which comprises; mixing said iron ore uniformly with a basic fluxing agent, said fluxing agent containing a magnesium compound which yields magnesium oxide when heat treating the said iron ore mixture, said magnesium compound providing an amount of magnesium oxide equal to at least about 50% by weight of the silicon dioxide content of said iron ore, heating said iron ore mixture in a gaseous atmosphere to effect a temperature in excess of about 2200° F. throughout said iron ore mixture, and removing gaseous products containing arsenic from at least a portion of said heated iron ore mixture; whereby a fluxed iron ore product is obtained having a substantially reduced arsenic content.

9. A process as in claim 8, wherein said fluxing agent contains calcium oxide in an amount not exceeding about 20% by weight of the silicon dioxide content of said ore and the balance of said fluxing agent required to substantially flux said silicon dioxide consists of said magnesium compound.

10. A process of removing arsenic from an iron ore having an objectionable amount of arsenic in excess of about .03% by weight and having an excess of silicon dioxide over basic components in the said iron ore while heat treating said iron ore which comprises; mixing said iron ore in a finely divided form uniformly with a basic fluxing agent and carbonaceous material in finely divided form in an amount which when ignited in any oxygen-containing atmosphere provides a temperature in said iron ore mixture in excess of about 2200° F. said fluxing agent containing a magnesium compound which yields magnesium oxide when heat treating the said iron ore mixture, said magnesium compound providing an amount of magnesium oxide equal to at least about 50% by weight of the silicon dioxide content of said iron ore with said magnesium oxide comprising a major proportion of the fluxing agent, heating said iron ore mixture by igniting said carbonaceous material in an oxygen-containing atmosphere and effecting a temperature in excess of about 2200° F. throughout said iron ore mixture, and removing gaseous products containing arsenic from at least a portion of said heated iron ore mixture; whereby a fluxed iron ore product is obtained having a substantially reduced arsenic content.

11. A process as in claim 10, wherein said fluxing agent contains calcium oxide in an amount not exceeding about 20% by weight of the silicon dioxide content of said ore and the balance of said fluxing agent required to substantially flux said silicon dioxide consists of said magnesium compound.

12. A process of removing arsenic from an iron ore having an objectionable amount of arsenic in excess of about .03% by weight of said iron ore and having an excess of silicon dioxide over basic components in the said iron ore while heat treating said iron oxide which comprises; mixing a finely divided iron ore uniformly with a finely divided basic fluxing agent and a finely divided carbonaceous material comprising about 6% by weight of said mixture, said fluxing agent containing a magnesium compound which yields magnesium oxide when heat treating the said iron ore mixture, said magnesium compound providing an amount of magnesium oxide between about 2% and 9% by weight of the iron ore heat treated product with said magnesium oxide comprising a major proportion of the fluxing agent, heating said iron ore mixture by igniting said carbonaceous material in an oxygen-containing atmosphere and effecting a temperature throughout said mixture of at least about 2350° F., and removing gaseous products containing arsenic from at least a portion of said heated iron ore mixture; whereby a fluxed iron ore product is obtained having a substantially reduced arsenic content.

13. A process as in claim 12, wherein said magnesium compound provides an amount of magnesium oxide at least about equal to the amount of silicon dioxide in said iron ore.

14. A process as in claim 12, wherein said magnesium compound provides an amount of magnesium oxide comprising about 8% by weight of said iron ore.

15. A process as in claim 12, wherein said iron ore mixture is heated as a uniform sinter bed disposed on a moving sinter strand.

16. A process as in claim 10, wherein said iron ore mixture is formed into pellets and thereafter said pellets are heated in a heat indurating apparatus by means of a hot gas effecting a temperature in excess of about 2350° F.

17. In a process of purifying an arsenic-containing iron ore comprising heating a finely divided arsenic-containing iron ore supported as a bed on a continuously moving conveyor means by passing a gas through said iron ore to cause a heat front to pass progressively therethrough and heat the said iron ore to at least a temperature at which arsenic components of the iron ore are separated from said iron ore and substantially removed in the gas, the improvement comprising; collecting the gases from a section of the said bed of iron ore supported on said conveyor means beginning about where said heat front passes through the final portion of the said bed on said conveyor means, which gases contain a substantial proportion of arsenic, separately from the remaining gas passing through other sections of said iron ore bed during said heating, and conveying from said iron ore bed the said gases containing a substantial amount of the said arsenic separately from said remaining gas passing through said bed during said heating to effect more economical treatment of said iron ore.

18. A process as in claim 17, wherein said arsenic-containing iron ore of said bed is in the form of a sinter mixture containing at least about 6% by weight of a combustible carbonaceous material.

19. A process as in claim 17, wherein said arsenic-containing iron ore of said bed is in the form of pellets.

20. A process as in claim 17, wherein the said gases are withdrawn from said iron ore bed at the said section thereof where said heat front passes through the final portion of said bed and having a temperature of at least 400° F. when leaving said iron ore bed; whereby condensation of arsenic in said bed is prevented.

21. A process as in claim 17, wherein the iron ore bed of the section from which said gases are withdrawn has a temperature between about 1600° F. and about 2350° F.

22. A process as in claim 17, wherein the said gases are treated in apparatus for removing arsenic therefrom before said gases are discharged to the atmosphere.

References Cited

UNITED STATES PATENTS

| | | | |
|---|---|---|---|
| 2,750,273 | 6/1956 | Lellep | 75—3 |
| 2,871,115 | 1/1959 | Agarwal | 75—3 |
| 2,914,395 | 11/1959 | Davies | 75—5 |
| 2,977,215 | 3/1961 | Meyer et al. | 75—3 |
| 2,990,268 | 6/1961 | DeVaney | 75—5 |
| 3,244,507 | 4/1966 | Linney | 75—5 |

BENJAMIN HENKIN, *Primary Examiner.*